(12) United States Patent
Wang et al.

(10) Patent No.: US 7,428,491 B2
(45) Date of Patent: Sep. 23, 2008

(54) METHOD AND SYSTEM FOR OBTAINING PERSONAL ALIASES THROUGH VOICE RECOGNITION

(75) Inventors: Kuansan Wang, Bellevue, WA (US); Neal A. Bernstein, Mercer Island, WA (US); Xuedong David Huang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 616 days.

(21) Appl. No.: 11/009,925

(22) Filed: Dec. 10, 2004

(65) Prior Publication Data

US 2006/0129398 A1 Jun. 15, 2006

(51) Int. Cl.
G10L 15/06 (2006.01)
G10L 15/00 (2006.01)
G06F 17/21 (2006.01)

(52) U.S. Cl. ............... 704/244; 704/10; 704/243
(58) Field of Classification Search ............ 704/9, 704/10, 231, 254, 270, 243, 244
See application file for complete search history.

(56) References Cited

U.S. PATENT DOCUMENTS

| | | | | |
|---|---|---|---|---|
| 6,330,308 | B1 * | 12/2001 | Cheston et al. | 379/88.04 |
| 6,421,672 | B1 * | 7/2002 | McAllister et al. | 707/10 |
| 6,925,154 | B2 * | 8/2005 | Gao et al. | 379/88.03 |
| 6,963,633 | B1 * | 11/2005 | Diede et al. | 379/88.03 |
| 7,065,483 | B2 * | 6/2006 | Decary et al. | 704/7 |
| 7,085,257 | B1 * | 8/2006 | Karves et al. | 370/352 |
| 7,225,132 | B2 * | 5/2007 | Attwater et al. | 704/273 |
| 7,246,060 | B2 * | 7/2007 | Geidl et al. | 704/235 |
| 7,249,013 | B2 * | 7/2007 | Al-Onaizan et al. | 704/9 |
| 2002/0168964 | A1 * | 11/2002 | Kraft | 455/412 |
| 2002/0173956 | A1 * | 11/2002 | Hartley et al. | 704/231 |
| 2003/0187650 | A1 * | 10/2003 | Moore et al. | 704/260 |
| 2004/0186819 | A1 * | 9/2004 | Baker | 707/1 |
| 2004/0243407 | A1 * | 12/2004 | Yu et al. | 704/240 |
| 2005/0114453 | A1 * | 5/2005 | Hardt | 709/206 |
| 2005/0119875 | A1 * | 6/2005 | Shaefer et al. | 704/7 |
| 2005/0233730 | A1 * | 10/2005 | Snyder | 455/412.1 |
| 2006/0277030 | A1 * | 12/2006 | Bedworth | 704/4 |
| 2007/0005370 | A1 * | 1/2007 | Elshout | 704/275 |

OTHER PUBLICATIONS

Jiang et al., L., "Improvements on Trainable Letter-To-Sound Converter", International Conference on Acoustics, Speech and Signal Processing, May 2004.
Jiang et al., L., "Improvements on Trainable Letter-To-Sound Converter", European Speech Communication Association (EuroSpeech '97), Rhodes, Greece, Sep. 1997.

* cited by examiner

*Primary Examiner*—Talivaldis Ivars Smits
*Assistant Examiner*—Douglas C Godbold
(74) *Attorney, Agent, or Firm*—Leanne Faveggia Farrell; Westman, Champlin & Kelly, P.A.

(57) ABSTRACT

Methods and systems for recognizing a spoken alias are disclosed. The present invention includes generating a plurality of alias variations based on a discoverable name and creating a phonetic representation for each of the alias variations. The present invention also includes capturing a phonetic pronunciation of the spoken alias. At least one of the created alias variations that has a phonetic representation that corresponds to the captured phonetic pronunciation is selected.

38 Claims, 5 Drawing Sheets

METHOD AND SYSTEM FOR OBTAINING PERSONAL ALIASES THROUGH VOICE RECOGNITION

BACKGROUND OF THE INVENTION

The present invention generally pertains to systems and methods for automatic pattern recognition. More specifically, the present invention relates to using a speech recognition system to recognize a personal alias.

An alias is a string of letters numbers and/or symbols that comprise an alternate name of a user or an email address of a user. Aliases are used for interacting with a computer network. User aliases or personal aliases generally contain at least portions of a user's first name, middle name and/or last name. For example, an alias can be a username portion of an email address.

Aliases were designed to be entered into a computing device using a keyboard. Aliases were never intended to be spoken in the natural language. Thus, if a user has a first name John and a last name Doe, then a possible alias for John Doe could be entered into a computing device as "jdoe". This example alias includes a portion of the user's first name and the user's full last name without any spaces between the portion of the first name and the full last name.

Automatic speech recognition systems transcribe voice into text using a pronunciation dictionary that spells out textual representations into phonemes. To accommodate out of dictionary vocabulary, such as acronyms and jargon, a letter-to-sound (LTS) subsystem is often included to account for words that are not in the dictionary. However, current LTS subsystems are designed to map orthography into phonemes. For example, if a user were to naturally speak the example alias "jdoe", a LTS subsystem would spell out the alias as "jay doe". To force a LTS subsystem to correctly spell out the alias "jdoe", a user would have to phonetically pronounce the "j" in combination with "doe" by not pronouncing the "j" as a letter. However, this phonetic pronunciation of an alias is unnatural and confusing.

Automatic speech recognition systems can also transcribe vocally spelled letters into text. However, automatic speech recognition systems have problems understanding individual letters that sound similar. For example, the letters "d", "e" and "v" all sound similar. Some automatic speech recognition systems employ ways to differentiate between similar sounding letters. For example, the systems require the speaker to say "v as in victor". However, this is a rather tedious way of entering text.

SUMMARY OF THE INVENTION

Embodiments of a present invention pertain to a method of recognizing a spoken alias. The method generates a plurality of alias variations based on a discoverable name and creates phonetic representations for each of the alias variations. The method also includes capturing a phonetic pronunciation of the spoken alias and selecting at least one of the created alias variations that has a phonetic representation that is at least close to the captured phonetic pronunciation. In one embodiment, the discoverable name is the name of a user. In another embodiment, the discoverable name is not a name of a user.

Embodiments of the present invention also pertain to a speech recognition system for recognizing a spoken alias. The system includes an alias variation engine configured to generate a plurality of alias variations based on a discoverable name of a target alias. The discoverable name of the target alias is accessible from a name database. The system also includes a phonetic representation engine configured to create phonetic representations for each of the alias variations. In addition, the system includes a speech recognition engine configured to capture a phonetic pronunciation of the spoken alias and select at least one of the alias variations created by the phonetic representation engine that corresponds to the captured phonetic pronunciation.

DETAILED DESCRIPTION OF ILLUSTRATIVE EMBODIMENTS

The present invention is described in the context of an automated speech recognition system for recognizing spoken aliases. Aliases are defined, herein, as a continuous, uninterrupted string of characters (letters, numbers and/or symbols) that comprise an alternate name of a user or an email address of a user. Aliases are used for interacting with a computer network or interacting with others who are communicating over a network. Aliases generally or frequently contain at least portions of a first name, middle name last name and/or organization name. For example, an alias can be a username portion of an email address, a username for instant messaging applications, or the URI (uniform resource identifier) portion of an email address. This is not an exhaustive list of aliases. Other types of aliases are contemplated by the present invention.

Example implementations for such a system includes computing devices such as desktops or mobile devices and computing devices that run automated service programs or automated call centers. Example mobile devices include personal data assistants (PDAs), landline phone and cellular phones. Example automated service programs include automated banking services, automated credit card services, automated airline service and etc. This list of computing devices is not an exhaustive list. Other types of devices are contemplated by the present invention. Prior to describing the present invention in detail, embodiments of illustrative computing environments within which the present invention can be applied will be described.

Figure 1:
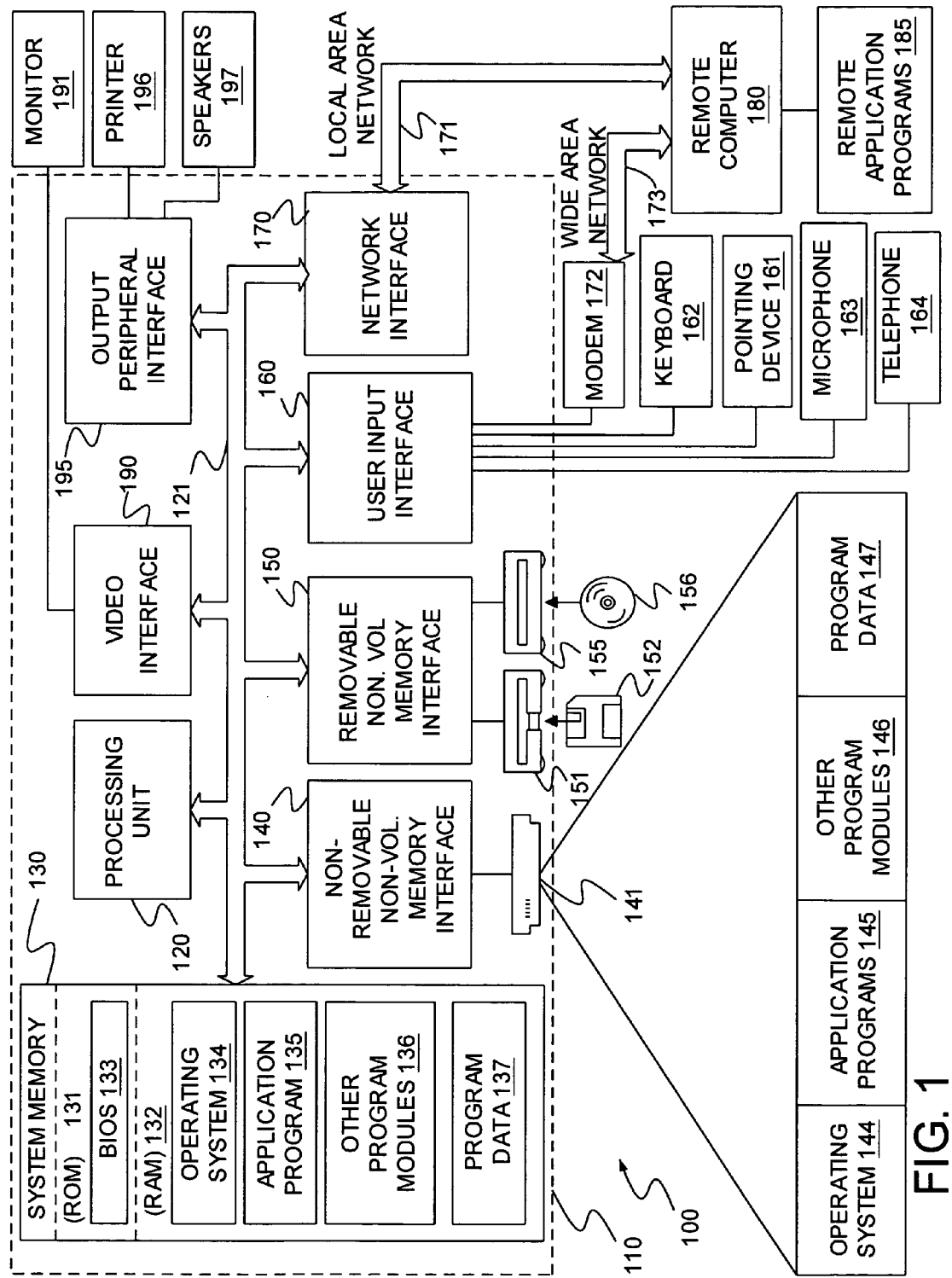
FIG. 1 illustrates a block diagram of a general computing environment in which the present invention can be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, a pointing device 161, such as a mouse, trackball or touch pad and a telephone 164. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
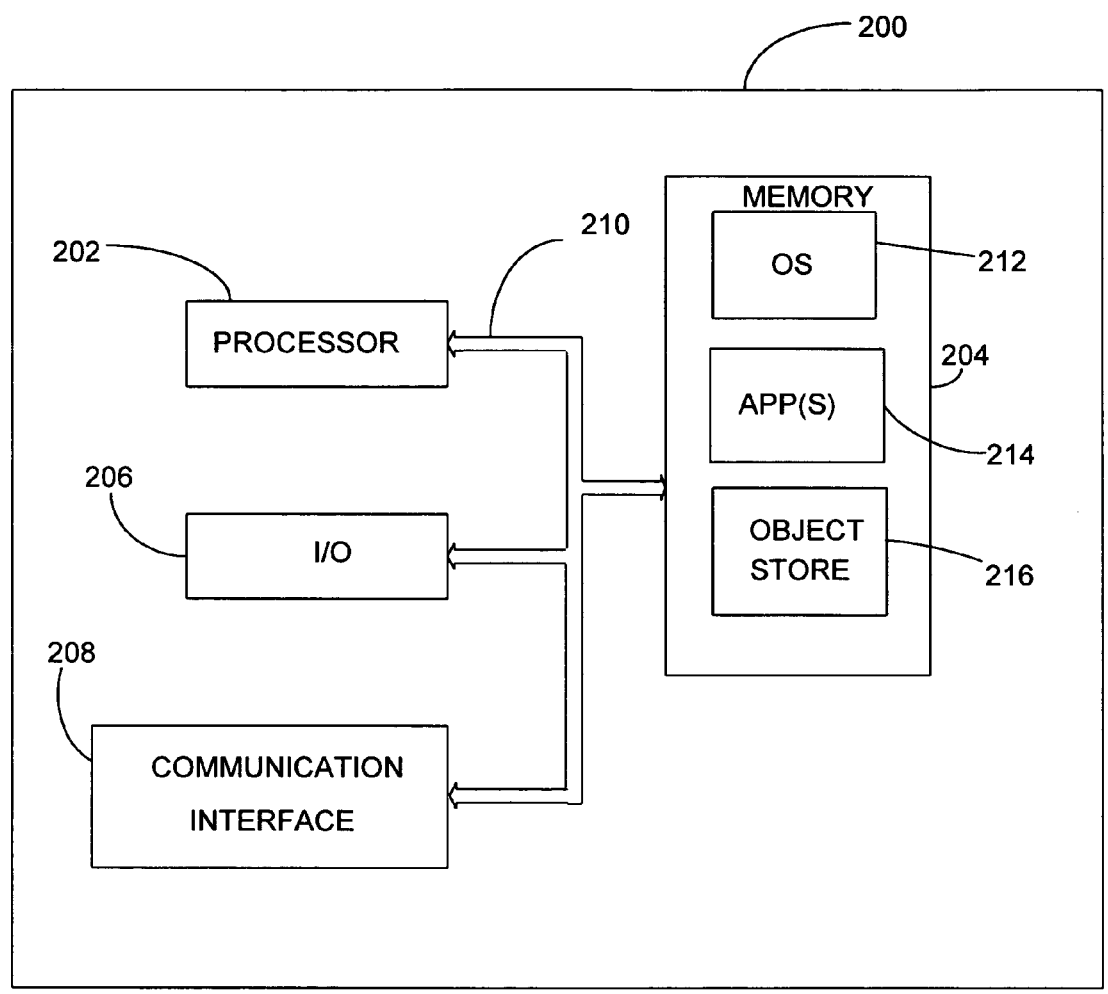
FIG. 2 illustrates a block diagram of a mobile device with which the present invention can be practiced.

FIG. 2 is a block diagram of an example mobile device 200, which is another applicable computing environment. Mobile device 200 includes a microprocessor 202, memory 204, input/output (I/O) components 206, and a communication interface 208 for communicating with remote computers or other mobile devices. In one embodiment, the aforementioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
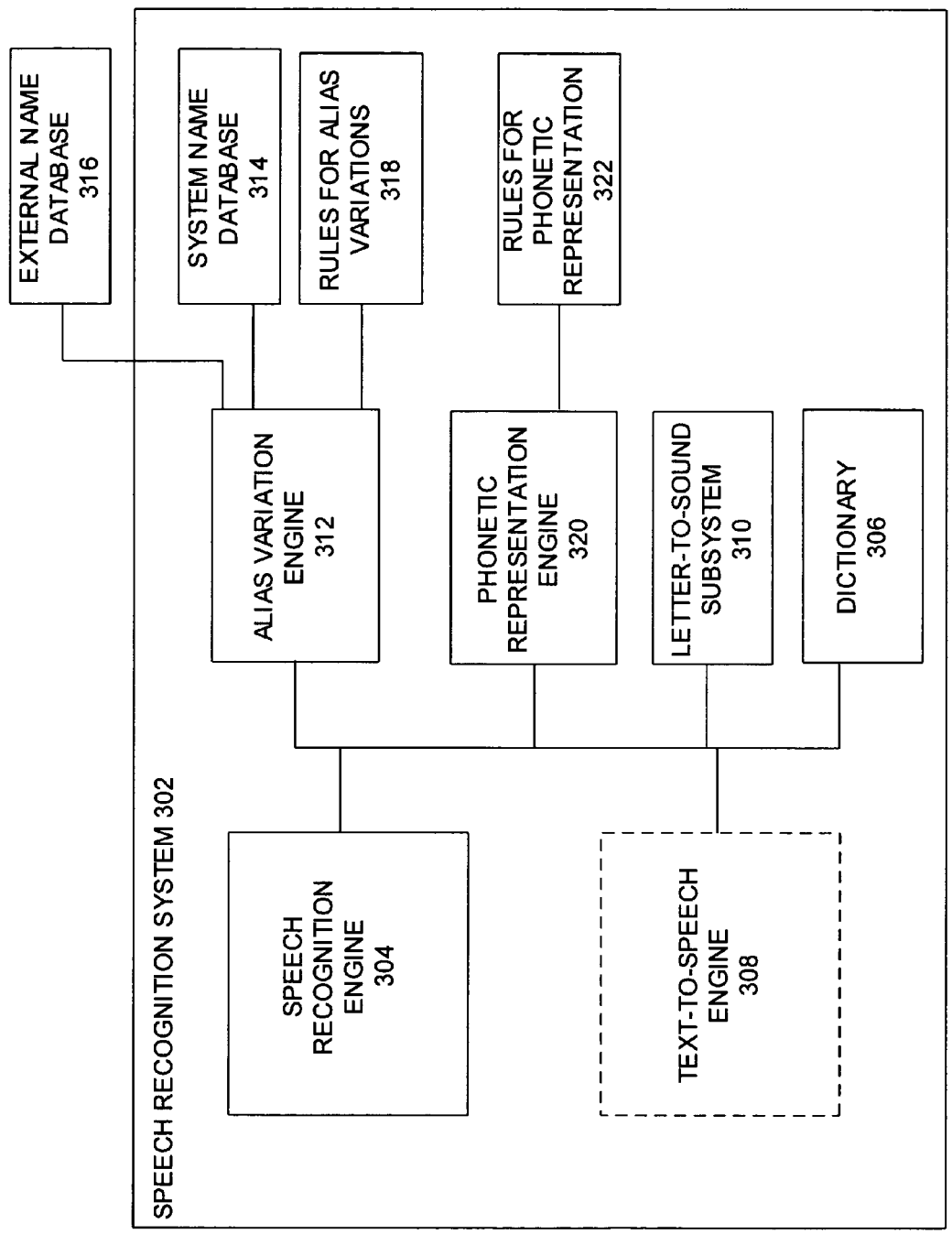
FIG. 3 illustrates a speech recognition system for recognizing a spoken alias.

FIG. 3 illustrates a speech recognition system 302 for recognizing a spoken alias in accordance with an embodiment of the present invention. Speech recognition system 302 can be incorporated into any of the above-described computing devices. Speech recognition system 302 includes a speech recognition engine 304 that utilizes a dictionary 306 to transcribe voice into text. Dictionary 306 holds a list of terms and associated pronunciations that are recognized by speech recognition engine 304. Speech recognition engine 304 also utilizes a letter-to-sound (LTS) subsystem 310 to convert letters to sounds and sounds to letter. LTS subsystem 310 accounts for words that are not in dictionary 306. LTS subsystem 310 contains a set of letter-to-sound rules. The set of letter-to-sound rules are determined by using a machine learning technique to deduce rules from an external dictionary or database.

Speech recognition system 302 may also optionally include a text-to-speech engine 308 (shown in dashed lines) for converting text into spoken output. Text-to-speech engine 308 has access to dictionary 306 and LTS subsystem 310. Text-to-speech engine 308 first uses dictionary 306 to locate pronunciations and then resorts to using the LTS subsystem 310 when the word being processed is not in the dictionary. Those skilled in the art will appreciate that the text-to-speech engine 308 need not be part of speech recognition system 302. Rather, text-to-speech engine 308 may be a part of a separate speech synthesis unit or not included at all. Those skilled in the art will further appreciate that speech recognition engine 304 and text-to-speech engine 308 can have their own respective dictionaries and LTS subsystems.

LTS subsystem 310 is configured to map orthography to phonemes. Generally, aliases are spoken in the natural language. Therefore, LTS sub-system 310 can not properly recognize a naturally spoken alias. To recognize a spoken alias, speech recognition system 302 includes an alias variation engine 312 that is configured to access a system name database 314 or an external name database 316 and a set of rules 318 for defining alias variations. Speech recognition system 302 also includes a phonetic representation engine 320 configured to access a set of rules 322 for defining phonetic representations. The following is a description of a method for recognizing a spoken alias using the components of speech recognition system 302.

Figure 4:
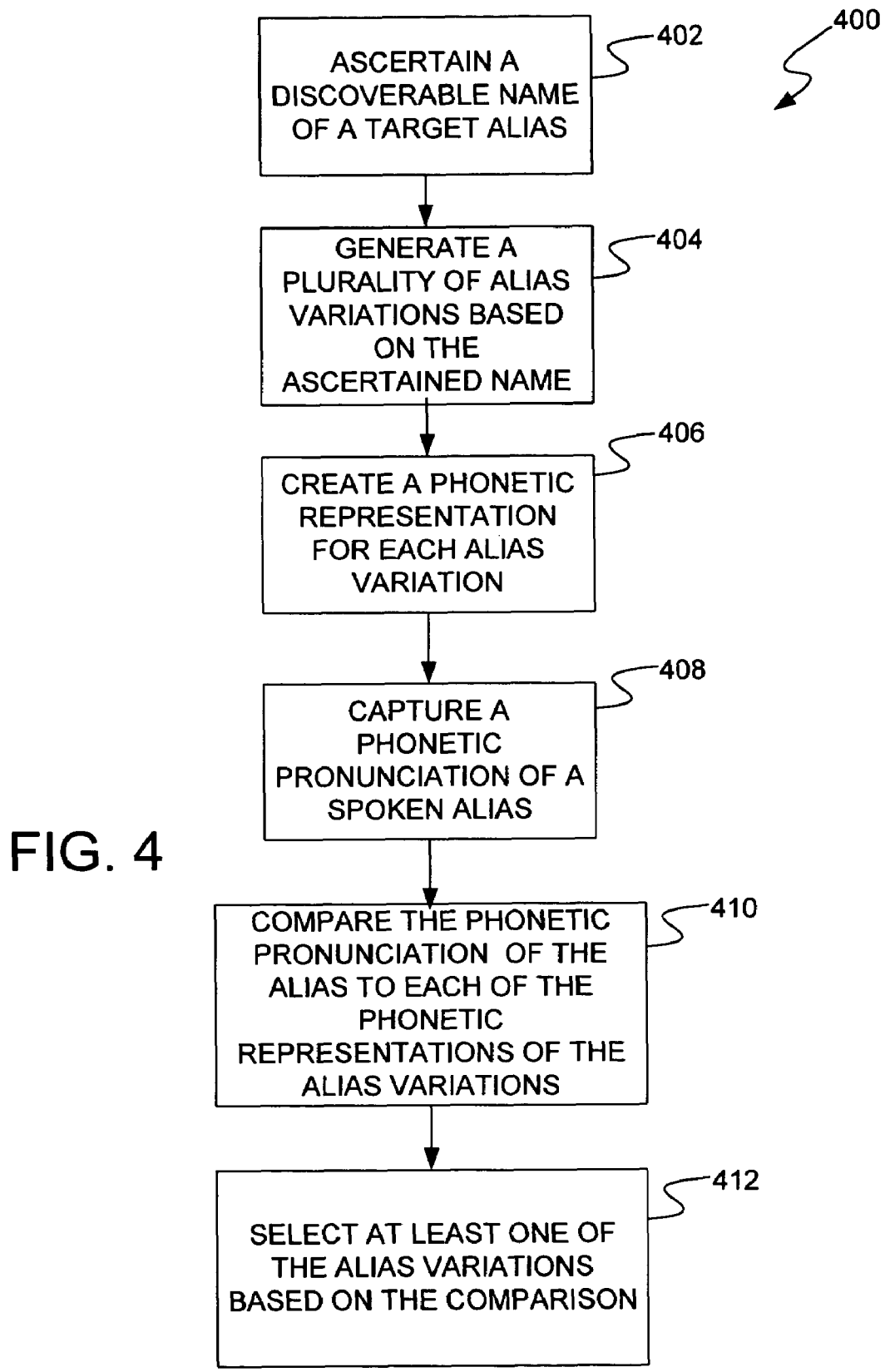
FIG. 4 is a flow chart for illustrating the steps performed by the speech recognition system of FIG. 3.
Figure 5:
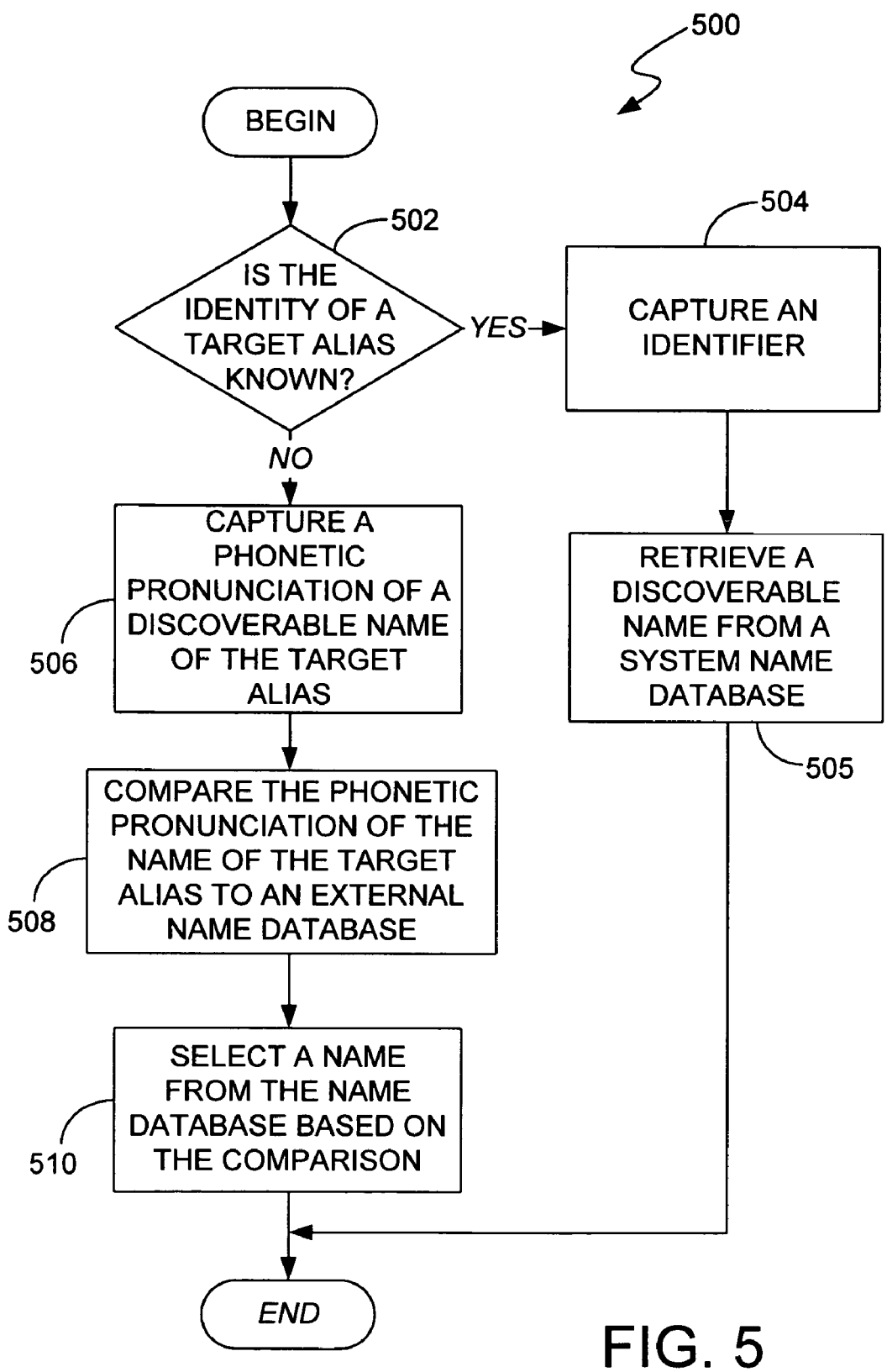
FIG. 5 is a flow chart for illustrating the steps of ascertaining a discoverable name.

FIGS. 4 and 5 include flowcharts 400 and 500 for illustrating the steps performed by speech recognition system 302 for recognizing a spoken alias in accordance with an embodiment of the present invention. The target alias is an alias which system 302 is attempting to recognize. Referring to FIG. 4, speech recognition system 302 ascertains an identity of a target alias at block 402 by determining a discoverable name of the target alias. In addition, speech recognition system 302 can ascertain a discoverable organizational name of the target alias.

Referring to FIG. 5, flowchart 500 illustrates the steps performed for ascertaining the discoverable name of the target alias as indicated in block 402 of FIG. 4. In one embodiment, the target alias is an alias of a user. For example, the user can speak their own alias for recognition. In another embodiment, the target alias is a personal alias that is not an alias of the user. For example, the user is speaking an alias of a person that the user desires to communicate with. When the target alias is a user's alias, then system 302 may have an existing relationship with the user. For example, system 302 can be implemented in a customer call center application with which the user has an existing account. However, it is possible that when the target alias is a user's alias, system 302 may not have an existing relationship with the user. For example, system 302 can be implemented in a customer call center application with which the user is enrolling.

At block 502, speech recognition system 302 determines whether the identity of the target alias is known. In one embodiment, speech recognition system 302 knows the identity of the target alias if the system has an existing relationship with the user. Depending on the type of relationship that system 302 has with the user, the system captures an identifier of the user at block 504. For example, the user's identifier can be, but is not limited to, the user's discoverable name, employee number, customer number, order number or social security number.

After system 302 captures the identifier, system 302 proceeds to block 505 and retrieves the name of the user or name of the target alias from a system name database 314. System name database 314 includes a list of stored discoverable names and corresponding identifiers. The list of discoverable names can include combinations of first names, middle names, last names or organization names. Upon retrieval of a discoverable name from system name database 314, system 302 proceeds to block 404 in FIG. 4.

If, at block 502, speech recognition system 302 does not know the identity of the target alias, then the system proceeds to block 506. At block 506, system 302 captures a phonetic pronunciation of a discoverable name of the target alias. The discoverable name of the target alias can be a combination of a first name, middle name, last name or organization name. At block 508, system 302 compares the phonetic pronunciation of the name of the target alias to external name database 316. External name database 316 is a list of names that exists outside of system 302. For example, external name database 316 can be a list of names from a directory assistance provider or a list of names mined from the Internet. Each of the list of names in database 316 has a corresponding phonetic pronunciation. At block 510, system 302 selects a name from external name database 316 based on the comparison between the captured phonetic pronunciation of the target alias name and the corresponding phonetic pronunciations of the list of names in database 316. After a name is selected, system 302 proceeds to block 404 in FIG. 4.

At block 404, alias variation engine 312 generates a plurality of alias variations based on the name that was ascertained from either system name database 314 or external name database 316. To generate a plurality of alias variations, alias variation engine 312 is configured to access the set of rules 318 for alias variations.

The set of rules 318 for alias variations are a set of predefined rules. The predefined rules instruct alias variation engine 312 how to generate different statistical variations of a written alias based on the ascertained name. For example, if the user's name is John Doe, then alias variation engine 312 can generate a list of alias variations such as jdoe, johndoe, johnd and etc. If the organization's name is Microsoft, then the alias variation engine 312 can generate a list of alias variations such as microsoft.com, microsoft.net, microsoft.sp.net and etc. The set of rules 318 for alias iterations can be determined by using a machine learning technique for deducing rules. This machine learning approach can obtain its training data by utilizing databases found in the Internet. For example, the machine learning approach can mine and harvest email addresses from public email servers or mine through the Internet in general to generate ways in which an alias is formed. Examples of techniques for the training process include a Classification and Regression Tree (CART) or artificial neural networks.

At block 406, phonetic representation engine 320 creates a phonetic representation for each alias generated by alias variation engine 312. Phonetic representation engine 320 is configured to access the set of rules 322 for phonetic representation of an alias. The set of rules 322 for phonetic representations are predefined rules. The predefined rules instruct phonetic representation engine 320 in forming pronunciations for each alias variation of the plurality of alias variations using natural language phonemes.

At block 408, speech recognition engine 304 captures a phonetic pronunciation of a spoken alias from a user. At block 410, speech recognition system 302 compares the phonetic pronunciation of the spoken alias to each of the phonetic representations of the alias variations. At block 412, system 302 selects at least one of the aliases, from the plurality of alias variations, based on the captured phonetic pronunciation.

Those skilled in the art will appreciate that system 302 may find more than a single alias from the plurality of alias variations that is based on the captured phonetic pronunciation of the spoken alias. However, those skilled in the art will further appreciate that system 302 may find only a single alias from the plurality of alias variations that is close to the spoken alias. In either case, one embodiment of the present invention includes presenting at least one of the aliases from the plurality of alias variations based on the captured phonetic pronunciation of the spoken alias. By presenting the closest alias variations, the user can pick the proper alias.

In one embodiment, a text-to-speech engine, such as text-to-speech engine 308 of FIG. 3, is configured to present the alias variations based on the captured phonetic pronunciation of the spoken alias by converting the aliases from text to speech. For example, text-to-speech engine 308 can present the aliases in a sequentially numbered list or in a list having corresponding identifiers. For example, an identifier can be an alpha-numeric symbol. After system 302 presents the aliases, the system captures an input signal from the user which corresponds to the alias that the user chooses as the proper alias. The input signal includes, but is not limited to, a speech signal or a signal from an input device that has a corresponding identifier. Examples of an input device include, but are not limited to, a keypad, a touch screen, or a mouse. The use of an input device broadens the usage of system 302 in cases where speech is not appropriate. For example, speech may not be appropriate in noisy environments and environments where privacy is a concern.

In another embodiment, system 302 displays a list of alias variations based on the captured phonetic pronunciation of the spoken alias. For example, system 302 can display the closest alias in a sequentially numbered list or in a list having corresponding alpha-numeric symbols. The user views the aliases and their corresponding symbol. The user chooses the proper alias by speaking the identifier that it corresponds with or by selecting the corresponding identifier with an input device. Examples of an input device include, but are not limited to, a keypad, a touch screen or a mouse. As discussed above, an input device broadens the usage of system 302 in cases where speech is not appropriate. After the proper alias variation is selected it is stored in system 302 for later retrieval.

Some embodiments of the present invention include recognizing email addresses. In this embodiment, speech recognition system 302 can recognize a username portion and an email address URI portion of an email address in accordance with the present invention. In the alternative, the username portion is recognized in accordance with the present invention and the URI portion is determined using techniques commonly used for recognizing Internet domain names for websites.

Although the present invention has been described with reference to particular embodiments, workers skilled in the art will recognize that changes may be made in form and detail without departing from the spirit and scope of the invention.

What is claimed is:

1. A method of recognizing a spoken alias, the method comprising:
   retrieving a name from a selected listing in a database;
   processing the retrieved name to generate a plurality of alias variations in orthographical form using the name retrieved from the selected listing;
   creating a phonetic representation for each of the alias variations that are in orthographical form;
   capturing a phonetic pronunciation of an input alias that corresponds to the selected listing; and
   selecting at least one of the plurality of alias variations based on the captured phonetic pronunciation of the spoken alias.

2. The method of claim 1, wherein the plurality of alias variations comprises a plurality of email username variations.

3. The method of claim 1, wherein the plurality of alias variations comprises a plurality of URI name variations.

4. The method of claim 1, further comprising determining whether the name to be retrieved from a selected listing belongs to a user of a system that is retrieving the name, generating the plurality of alias variations, creating the phonetic representation for each of the alias variations, capturing the phonetic pronunciation for the alias and selecting the at least one of the plurality of alias variations.

5. The method of claim 4, further comprising capturing an identifier related to the selected listing to retrieve the name from the selected listing.

6. The method of claim 5, wherein capturing the identifier comprises capturing one of the name, a customer number, a social security number and an order number if the selected listing belongs to a user of the system.

7. The method of claim 4, wherein retrieving the name from a selected listing in the database comprises retrieving the name from a database internal to the system if the selected listing belongs to a user of the system.

8. The method of claim 4, further comprising capturing the name if the selected listing is unknown to the system.

9. The method of claim 8, wherein retrieving the name from a selected listing in the data base comprises comparing the name to an external database of listings.

10. The method of claim 9, wherein the external database of listings comprises at least a list of names provided by a directory assistance provider.

11. The method of claim 9, further comprising selecting a name from the external database of names based on the comparison.

12. The method of claim 1, wherein selecting at least one of the alias variations comprises presenting at least one of the alias variations in a list, wherein each alias variation has a corresponding identifier.

13. The method of claim 12, wherein presenting the list of at least one of the alias variations comprises audibly presenting the list of at least one of the alias variations.

14. The method of claim 12, wherein presenting the list of at least one of the alias variations comprises displaying the list of at least one of the alias variations.

15. The method of claim 12, farther comprising capturing an input signal, the input signal indicating the alias variation selected from the presented list of at least one of the alias variations.

16. The method of claim 15, wherein the input signal comprises a signal derived from an input device.

17. The method of claim 15, wherein the input signal comprises a speech signal.

18. A computer-implemented method of obtaining an alias with a speech recognition system, the method comprising:
   retrieving a name from a selected listing in a database;
   generating a plurality of alias variations in orthographical form using the name retrieved from the selected listing;
   creating a phonetic representation for each of the alias variations that are in orthographical form;
   capturing a phonetic pronunciation of a target alias that corresponds to the selected listing; and
   comparing the phonetic pronunciation of the target alias to each of the phonetic representations of the plurality of generated alias variations.

19. The method of claim 18, wherein retrieving the name from a selected listing in the database comprises retrieving the name from a database internal to the speech recognition system if the selected listing belongs to a user of the system.

20. The method of claim 18, further comprising retrieving the name from a selected listing in the database comprises retrieving the name from a database external to the speech recognition system if the selected listing is unknown to the system.

21. The method of claim 18, further comprising selecting at least one of the generated alias variations that has a phonetic representation that corresponds to the captured phonetic pronunciation of the target alias.

22. The method of claim 21, wherein selecting at least one of the generated alias variations comprises presenting at least one of the alias variations in a list, wherein each alias variation has a corresponding identifier.

23. The method of claim 22, further comprising capturing an input signal from the user, the input signal indicating the alias variation selected by the user from the presented list of alias variations.

24. The method of claim 23, wherein the input signal comprises a signal derived from an input device.

25. The method of claim 23, wherein the input signal comprises a speech signal.

26. The method of claim 18, further comprising storing at least one of the generated alias variations based on the comparison.

27. A speech recognition system for recognizing a spoken alias, the system comprising:
   an alias variation engine configured to generate a plurality of alias variations in orthographical form by processing a name retrieved from a selected listing in a database that corresponds with the spoken alias, the discoverable name accessible from a name database;
   a phonetic representation engine configured to create a phonetic representation for each of the alias variations that are in textual form;
   a speech recognition engine configured to:
      capture a phonetic pronunciation of an input alias that corresponds to the selected listing; and
      select at least one of the plurality of alias variations created by the phonetic representation engine based on the captured phonetic pronunciation of the spoken alias.

28. The system of claim 27, wherein the alias variation engine is further configured to generate the plurality of alias variations based on a set of variation rules for alias variations.

29. The system of claim 28, wherein the set of variation rules for alias variations is trained by mining through the Internet.

30. The system of claim 29, wherein the set of variation rules for alias variations is based on statistics.

31. The system of claim 27, wherein the phonetic representation engine is further configured to create a phonetic representation for each alias variation based on a set of phonetic representation rules.

32. The system of claim 27, wherein the speech recognition engine is further configured to compare the spoken alias to each of the phonetic representations of the plurality of generated alias variations.

33. The system of claim 27, further comprising a text-to-speech engine configured to convert the at least one of the selected alias variations from textual forms to spoken representations.

34. The system of claim 33, wherein the speech recognition engine is further configured to present a list of the at least one of the selected alias variations, wherein each alias variation has a corresponding identifier.

35. A method performed by a speech recognition system comprising:

capturing an identifier related to a selected listing in a database;

retrieving a name from the selected listing;

processing the name to generate a plurality of alias variations in orthographical form using the name retrieved from the selected listing;

creating a phonetic representation for each of the alias variations that are in orthographical form;

capturing a phonetic pronunciation for an alias of the selected listing that is provided by a speaker;

comparing the phonetic pronunciation of the alias to each of the phonetic representations of the plurality of generated alias variations; and selecting at least one of the plurality of alias variations having the phonetic representation that matches the phonetic representation of the alias provided by the speaker.

36. The method of claim 35, further comprising determining whether the name to be retrieved from a selected listing belongs to a user of the speech recognition system.

37. The method of claim 36, wherein retrieving the name of a selected listing in a database comprises retrieving the name of the selected listing from a database internal to the speech recognition system if the selected listing belongs to a user of the system.

38. The method of claim 36, wherein retrieving the name of a selected listing in a database comprises retrieving the name of the selected listing from a database external to the speech recognition system if the selected listing is unknown to the system.

* * * * *

UNITED STATES PATENT AND TRADEMARK OFFICE
CERTIFICATE OF CORRECTION

| | | |
|---|---|---|
| PATENT NO. | : 7,428,491 B2 | Page 1 of 1 |
| APPLICATION NO. | : 11/009925 | |
| DATED | : September 23, 2008 | |
| INVENTOR(S) | : Kuansan Wang et al. | |

It is certified that error appears in the above-identified patent and that said Letters Patent is hereby corrected as shown below:

In column 9, line 58, in Claim 15, delete "farther" and insert -- further --, therefor.

Signed and Sealed this
Third Day of May, 2011

David J. Kappos
*Director of the United States Patent and Trademark Office*